Jan. 12, 1926.  
E. L. FORSHEE  
POULTRY DRINKING FOUNTAIN  
Filed Feb. 27, 1925
1,569,738
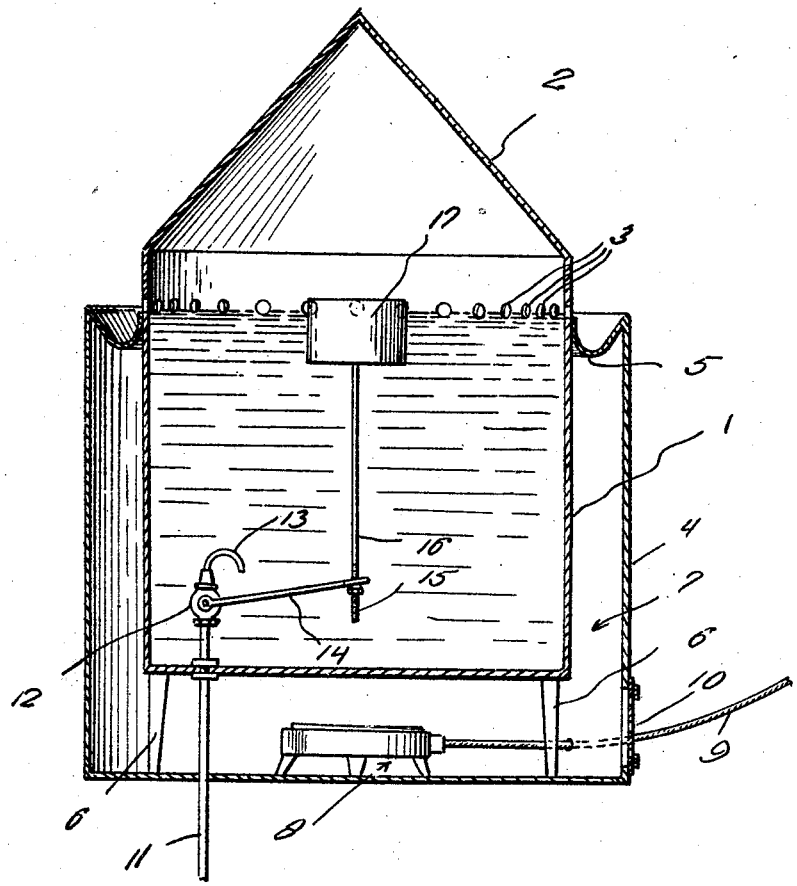
Inventor  
E. L. Forshee,  
By  
Attorney Patented Jan. 12, 1926.

1,569,738

UNITED STATES PATENT OFFICE.

ERNEST L. FORSHEE, OF AKRON, MICHIGAN.

POULTRY DRINKING FOUNTAIN.

Application filed February 27, 1925. Serial No. 12,028.

*To all whom it may concern:*

Be it known that I, ERNEST L. FORSHEE, a citizen of the United States, residing at Akron, in the county of Tuscola and State of Michigan, have invented certain new and useful Improvements in a Poultry Drinking Fountain, of which the following is a specification.

This invention relates to an improved drinking fountain which is especially, but not necessarily, adapted to automatically supply drinking water for poultry.

More particularly, the invention relates to a drinking fountain of this class which embodies a trough with which a water tank is associated, the water tank being provided with openings through which the water flows to collect in the trough, there being a float-controlled valve for automatically controlling the flow of the water so that the trough is filled with a predetermined quantity at all times, whereby to replenish the water in the trough automatically as it is consumed by the poultry.

The structural features and the advantages derived from their use will become apparent from the following description and drawings.

In the accompanying drawing forming a part of this application and in which like numerals are employed to designate like parts throughout the same:

The figure is a central vertical section, with parts in elevation, through a drinking fountain constructed in accordance with the present invention.

Referring to the drawings in detail, it will be seen that the tank is designated by the reference character 1, the same being of vertically elongated cylindrical form and having a conical top 2. Just below this conical top the wall of the tank is provided with a row of circumferentially spaced openings 3 through which the water in the tank is adapted to escape. Surrounding this tank is a casing or jacket 4, the upper end of which is bent inwardly and downwardly to provide a channel 5 which serves as a watering trough. It will be noted that the inner wall of the trough is disposed so that the free edge thereof terminates just below the water discharge opening 3. This permits free flowing of the water from the tank into the trough. It will be noted that the tank is provided at its bottom with supporting legs 6 which rest upon the bottom of the casing. Attention is also directed to the fact that the tank is of a diameter considerably less than that of the casing to provide an annular space 7 between the two for circulation of hot air. In this connection it will be observed that an appropriate burner 8 is placed within the casing beneath the tank, fuel being supplied to the burner by an electric cord 9. At the bottom, the casing is provided with a door 10. It might be stated here that in cold weather when the water in the tank might otherwise freeze, the burner is lighted to keep the water warm at all times to insure sufficient supply to the trough as the water in the latter is consumed. The annular heating space 7 permits effective and thorough heating of the tank.

Extending through the bottom of the casing and into and through the bottom of the tank is a water supply pipe 11 provided on its upper end with a valve 12 carrying a down turned discharge member 13. The valve is controlled by an arm 14 extending angularly from the pipe and this arm is connected to the screw threaded lower end 15 of a stem 16 carried by a float 17. Obviously as the water level recedes below a certain line, the float descends and turns the valve on to permit additional water to flow into the tank. When the level assumes its normal position, the float moves upwardly to turn the valve off.

It is thought that the foregoing description considered in connection with the accompanying drawing, will enable persons skilled in the art to which the invention relates to obtain a clear understanding of the same. For this reason a more lengthy description is thought unnecessary.

Although the preferred embodiment of the invention has been shown and described, it is to be understood that any minor changes coming within the field of invention as claimed may be resorted to if desired.

Having thus described the invention, what I claim as new is:—

A poultry drinking fountain comprising a cylindrical tank having a conical top, and provided in its side wall with a row of circumferentially spaced water discharge openings adjacent the upper edge thereof, a casing surrounding the tank in spaced relation thereto, the upper end of the casing being bent inwardly, and downwardly, and thence upwardly to provide an annular water trough, the inner wall of said trough engaging the cylindrical tank, the upper edge of the inner wall of the trough being disposed directly below said water discharge openings, and means for automatically maintaining a predetermined water level in the trough.

In testimony whereof I affix my signature.

ERNEST L. FORSHEE.